J. W. JAY.
FISHING FLY HOLDER.
APPLICATION FILED SEPT. 18, 1916.
1,231,165.
Patented June 26, 1917
2 SHEETS—SHEET 2.
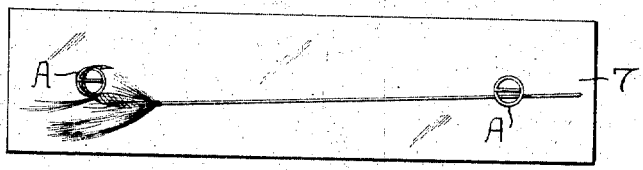
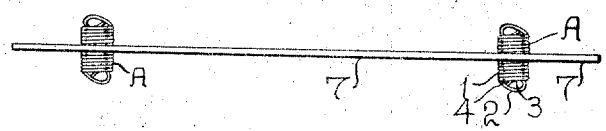
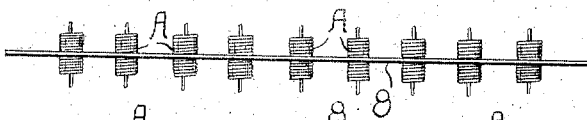
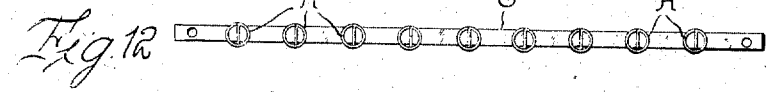
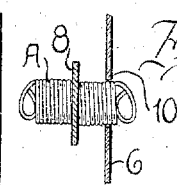
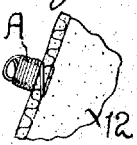
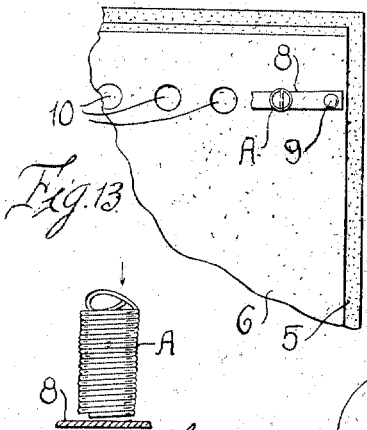
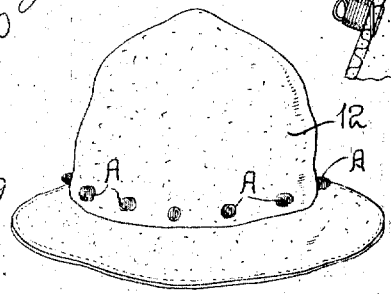
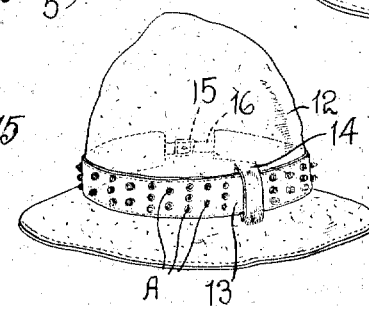
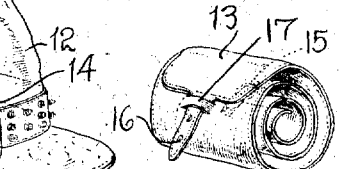
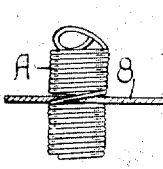
Inventor
J. W. JAY
By Frederick S. Still
Attorney

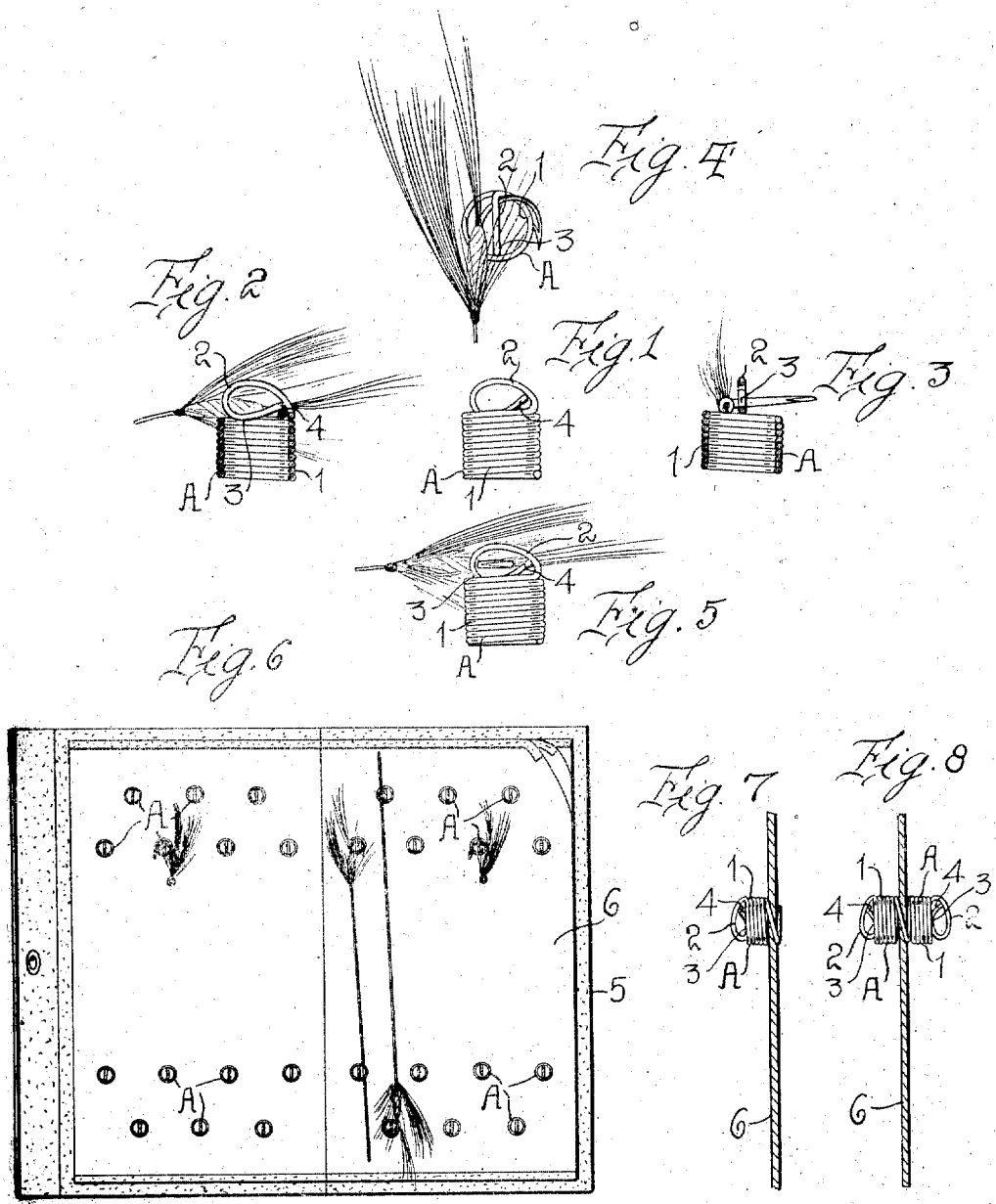

UNITED STATES PATENT OFFICE.

JAMES WILLIAM JAY, OF PHILADELPHIA, PENNSYLVANIA.

FISHING-FLY HOLDER.

1,231,165. Specification of Letters Patent. Patented June 26, 191 .

Application filed September 18, 1916. Serial No. 120,786.

*To all whom it may concern:*

Be it known that I, JAMES WILLIAM JAY, a citizen of the United States, residing at Philadelphia, in the county of Philadelphia and State of Pennsylvania, have invented certain new and useful Improvements in Fishing-Fly Holders, of which the following is a specification.

This invention comprehends certain new and useful improvements in fishing fly holders, and it has for its primary object a simple and durable construction of device of this character which will be capable of being very easily and cheaply manufactured and not liable to get out of order.

A further object of the invention is a device of this character comprising a combined hook and snell or gut holder, so constructed and arranged that when the hook of the fly is properly engaged with the eye of the holder, it cannot be accidentally detached, the device also embodying means whereby a plurality of hooks may be engaged therewith in different ways according to the number of flies in the angler's supply and the manner in which he may prefer to arrange same so as to best economize space.

A still further object of the invention and one of the most important objects is a device of this kind which will be found very convenient and otherwise efficient in use, in that a number of flies may be easily attached and detached without disturbing any except those desired for use or to be replaced; in that the flies will be securely held from accidental detachment no matter how roughly handled and without any liability of injuring either the hook portion of the fly or the snell; in that eyed flies without guts or snells, will be held equally as well; in that space may be economized to a maximum degree; and in that the combined clips and eyes that constitute the main improvements of my invention are applicable with equal facility to a fly book, a small plate, strip or similar holder, direct to the fisherman's hat, if desired, to a hat band, or to a combined hat band and fly roll, which will be hereinafter more specifically described.

And the invention also aims to generally improve devices of this class so as to render them more useful and commercially desirable.

With these and other objects in view, as will more fully appear as the description proceeds, the invention consists in certain constructions, arrangements and combinations of the different parts that I shall hereinafter more fully describe and claim.

For a full understanding of the invention, reference is to be had to the following description and accompanying drawings, in which—

Figure 1 is a detailed side view of a combined clip and eye constructed in accordance with my invention.

Fig. 2 is a vertical sectional view thereof showing the hook held by the eye,

Fig. 3 is a similar view with the section taken at right angles to the section of Fig. 2, Fig. 4 is a top plan view of the device, Fig. 5 is a side elevation showing one way in which the bill of the hook can be inserted through the eye instead of being securely gripped thereby, as it is shown in Fig. 2, Fig. 6 illustrates a fishing fly book with my devices applied thereto, Fig. 7 is a sectional view through one of the leaves of the book showing one modification or embodiment of the invention, Fig. 8 is a similar view showing a double form or embodiment of the inventive idea, Fig. 9 is a plan view of another embodiment of the invention hereinafter specifically described, Fig. 10 is an edge view of the device shown in Fig. 9, Fig. 11 illustrates in detail a plurality of the holding devices of the double form carried by a thin strip of metal or the like adapted to be riveted or otherwise secured at its ends to a support as, for example, the leaf of a fly book, Fig. 12 is a plan view of the device shown in Fig. 11, Fig. 13 is a fragmentary view of this form or embodiment of the invention showing the strip in connection with a leaf of the book.

Fig. 14 illustrates in section and partly in diagrammatic manner the method of applying these strips to the leaves of a fly book, Fig. 15 illustrates diagrammatically how the combined clip and eye of the double form may be constructed in connection with the strip, book leaf or the like designed to support it, Fig. 16 is a view similar to Fig. 15, illustrating a further step in the operation of formation, Fig. 17 illustrates roughly a fisherman's hat having the fly holding devices of my invention threaded directly therein.

Fig. 18 is a fragmentary sectional view thereof,

Fig. 19 is a view of a hat and combined hat band and roll embodying the improvements of my invention, and Fig. 20 illustrates the roll detached from the hat and in condition to be packed away and with the flies attached thereto, in the fisherman's kit or elsewhere.

Corresponding and like parts are referred to in the following description and designated in all of the views of the accompanying drawings by like reference characters.

In carrying out my invention and referring now particularly to Figs. 1 to 5 inclusive, I take a length of wire of the required strength and resilience and coil it into any desired number of convolutions in normal close contact with each other, as shown to form the coil spring clip portion 1 of my combined clip and eye, the device being designated "A" as a whole for purposes of convenience. After the coiled spring clip portion 1 of the holder A is formed, the wire is bent by pliers or a similar suitable tool into an eye 2 disposed in angular (and preferably rightangular) relation to the plane of the coils. The eye 2, it is to be particularly noted, is of peculiar formation, and for a distinct purpose. It is not merely a loop of semi-circular formation emanating from one side of the coiled portion of the device and terminating at a point diametrical thereto, but is coiled over and returned under upon itself as indicated at 3, to extend preferably slightly down into the coiled portion, the free spring extremity 4 of the eye terminating underneath the main or upper bar thereof whereby a preferably rounded shoulder is formed, so that, in order to secure the best results, a hook is snapped entirely underneath the eye 2 and is brought to rest back of, but still preferably in contact with, the spring extremity 4, whereby the hook preferably lies, not within the eye, but back of the spring extremity 4 of the eye, or in other words, is held securely clamped between the eye and the subjacent convolution of the coiled spring clip portion 1. By constructing the eye in this manner, I secure the best results, in that as I have found by repeated tests, it will be absolutely impossible to shake or otherwise detach the hook from underneath the eye and also practically impossible to even manually withdraw the hook from underneath the eye by endeavoring to slip the barbed extremity of the hook out by a sidewise motion. The only way in which the hook can be removed is by an intentional manual operation of snapping the hook out from underneath the rounded shoulder formed by the inwardly returned portion of the eye, while at the same time the operation of thus attaching and detaching the hook by the one proper movement or operation, just described, is not interfered with.

It must be understood, however, that while the preferred operation or manner of holding the hook is as hereinbefore described, yet the hook may also be held by being inserted within the eye, as illustrated in Fig. 5, although it manifestly will not be so securely held in such position. Nevertheless, the device, by its specific construction and arrangement of the parts, may hold a hook in three different ways, namely, the most secure way, which is by having the hook snapped underneath the eye, which permits of holding eyed flies with positive security (see Fig. 6); by having the bill of the hook inserted into and through the eye; and thirdly, by having the hook inserted in between any two of the convolutions of the coiled clip portion 1 of the holder, although this last named portion is designed particularly for holding the snells or guts as will be hereinafter more specifically described. Thus it will be seen that one combined clip and eye may serve to hold a plurality of hooks, although in the preferred adaptation of the inventive idea, only a single hook is intended to be held by one eye, and that in the preferred manner hereinbefore specified and best illustrated in Fig. 2 of the accompanying drawing.

The foregoing description refers particularly to the simplest form or embodiment of my invention, and I shall now describe some modifications, applications, or amplifications of the inventive idea, reference being first had to Fig. 6.

In Fig. 6 is represented a fly book 5, the leaves of which are designated 6 and which may be formed of paper, as is customary, or of any other desired substance or material. Secured to the leaves 6 are any desired number of my holders A and they may be arranged in any desired series or number of series or rows in alinement or in staggered relation to each other, as judgment or taste may dictate. They may, for example, be of the single form, as best illustrated in Fig. 7, or they may be of the double form, illustrated in Fig. 8, that is, may be so formed as to project from opposite faces of the leaves 6 whereby each sheet of the book may possess a double capacity. Preferably the holders are so secured to the leaves 6 that the hooks of the flies are secured by the eyes 2 and the snells or guts inserted in between the convolutions of the coiled spring clip portion 1 of an opposite holder, as clearly illustrated in Fig. 6, whereby the snells will be held stretched and in secure position, it being obvious that the flies can be very quickly attached and detached, but at the same time there will be no danger of any accidental detachment or disarrangement, and it will also be evident that any one of the flies can be easily detached without disturbing the others, not only with the arrangement illustrated in Fig. 6, but even if the flies were to be overlapped—that is, with one holder engaging the snell of one fly and the hook of another one. In this connection, it might be well to add that even when the same holder engages a plurality of hooks as, for example, with one in the eye and another one underneath the eye, and a third between the convolutions of the coils, any one of the flies may be easily detached without disturbing the others; and this is equally true, whether the hooks be provided with guts or snells, or whether they be eyed flies like those, for example, illustrated in Fig. 6.

As a further embodiment of the invention, reference is to be had to Figs. 9 and 10, in which 7 designates a strip of metal, leather or the like, carrying a relatively small number of single or double holders A (double in the present instance), this device being designed in the nature of an individual or small fly holding device that may be easily packed in and unpacked from the angler's box or kit, as required.

In Figs. 11 and 12, I have illustrated the holders A as secured to a thin strip 8 of metal or the like adapted to be riveted at its ends, as at 9, (see Fig. 13) to the leaves 6 of a fly book 5, whereby the holders may be made up in sets, attached to the strips 8, and the strips will form a very ready, quick, and convenient means for attaching a set of holders at one operation to the leaf. In this embodiment of the invention, the leaves 6 are preferably punched out, as at 10, at regular intervals whereby one set or series of holders may be readily passed through the leaf into proper position. If desired, the coiled portions of the holders may be slipped on the strip or support 8, the latter being inserted in between the two convolutions and the holders secured in position by solder or the like.

Figs. 15 and 16 illustrate diagrammatically, the preferred manner of forming the holders of the double type, and connecting them to their supports as, for example, the leaf of a fly book, as illustrated in Fig. 8, or the strip or plate 7 or the relatively narrow strip 8. I believe that the most practical way to make the holder is to make the springs in coils. An eye is then turned, and the coil with adequate number of convolutions is cut off, according to whether the holder is to be of the single or double type. If double, the holder is screwed through the support to the desired extent, as indicated in Figs. 15 and 16, and then the other eye is formed.

If desired, the holders A may be threaded directly into a fisherman's hat 12, as clearly illustrated in Figs. 17 and 18, which will be found very convenient to the angler as it is only necessary for him to select, from his fly book or the like, the assortment of flies that he thinks he will need for his fishing, the construction and arrangement of the parts of the combined clips and eyes enabling the angler to very quickly and easily select from this lot that are attached to the holders A of the hat 12, any fly which may suit his fancy, according to the condition of the water or atmospheric conditions and the like, while at the same time, no matter how roughly the hat is used, or no matter how energetic the motion of the fisherman's head may be, all liability of accidental detachment or entanglements of the flies will be positively precluded.

In Figs. 19 and 20, a still further embodiment of my invention is shown. In these views, I have illustrated a combined hat band and roll, designated 13. It may be of any desired width and thickness and provided with any desired number of combined clips and eyes, or holders A arranged in any desired way according to the capacity it is desired the combined hat band and roll shall have, and it is to be particularly noted in this connection that by using this device, it is not necessary for the fisherman to select, from his fly book or entire assortment, whatever number of flies he thinks he might want for the day's fishing, but can carry his entire supply or assortment with him at all times while fishing; and then, at the end of the day's fishing, all he has to do is to roll up the strip of leather or the like out of which the combined hat band and fly roll is formed, and without touching any of the flies, leaving them in place, as they will be so securely held by the holders A as to avoid any liability of becoming entangled or detached and thus the angler will in this one particular embodiment of my invention find a great convenience. Preferably the hat 12, in the use of the combined hat band and fly holder 13, is cut at one point to form a retaining strap 14, and all the angler has to do is to slip the device 13 underneath the strap 14 and buckle the ends together, as indicated at 15. When the day's fishing is done, the device 13 may be very easily detached from the hat and rolled upon itself as indicated in Fig. 20, the tab 16 designed for engagement with the buckle 15 being then inserted underneath and through the strap 17 formed at a suitable point upon the combined hat band and fly roll 13.

From the foregoing description in connection with the accompanying drawings, it will be seen that I have provided a very simple, efficient and durable and convenient means for holding fishing flies. The device will not be liable to get out of order, but will hold the flies in practically any and all preferred forms and in such a manner as to keep them in the best possible shape and at the same time permit the fisherman to select any fly and to replace any fly without disturbing the others.

Attention is also directed to the important and advantageous feature possessed by the invention in the application thereof to the hat band and roll illustrated in Figs. 19 and 20, whereby the old-style book is entirely dispensed with, and to the feature of screwing the holders directly into the hat, as illustrated in Fig. 17 and hereinbefore specifically described.

While the accompanying drawings illustrate what I believe to be the preferred embodiments of my invention, it is to be understood that the invention is not limited thereto, but that various changes may be made in the construction, arrangements and proportions of the parts without departing from the scope of the invention as defined in the appended claims.

What is claimed, is:

1. As a new article of manufacture, a fishing fly holder comprising a clip portion embodying a plurality of convolutions and at one end thereof a spring eye disposed in angular relation to the clip portion.

2. As a new article of manufacture, a fishing fly holder, comprising a clip portion embodying a plurality of closely grouped convolutions and an eye disposed in angular relation thereto, said eye being formed with a downwardly extending returned portion disposed across the subjacent convolution and terminating with its extremity normally in spaced relation to the latter.

3. A fishing fly holder, consisting of spring wire, coiled to form a plurality of closely grouped convolutions, the wire extending in angular relation to the convolutions at one end thereof, and across the same and thence being returned inwardly across the convolutions.

4. A fishing fly holder comprising a plurality of convolutions in spring-pressed relation to each other and an eye at one end of said convolutions, said eye having an opening extending therethrough whereby the bill of a hook may be inserted therein and provided with a rounded shoulder designed to co-act with the adjacent convolution whereby a hook may be pressed between the shoulder and adjacent convolution, and securely held thereby.

5. A fishing fly holder, consisting of a wire coiled into a number of convolutions and provided with a spring eye, in combination with means for supporting the holder engaging the same at a point between the ends of the convolute portion thereof.

6. A fishing fly holder embodying a coiled portion provided with a number of convolutions and provided at one end with a spring eye disposed in angular relation to the plane of the convolutions, in combination with a combined hat band and roll carrying said holder.

7. The combination with a fly holder comprising a coiled portion having a spring eye at each end thereof, of a support secured to the holder midway of the coiled portion of the latter.

8. In a fishing fly holder, the combination of a support, and a wire extending through the support upon opposite faces thereof and embodying on each side of the support a plurality of convolutions and an eye.

9. A device for holding a fishing fly, comprising a support, and a spring coil carried by the support, the convolutions of the coil being disposed substantially parallel to the plane of the support, and the coil provided at one end with an eye disposed in angular relation to the convolutions.

10. A device for holding a fishing fly, comprising a support, and a spring coil mounted thereon, the base convolution of the coil being secured rigidly upon the face of the support, and the coil terminating at its other end in an eye.

In testimony whereof I affix my signature in the presence of two witnesses.

JAMES WILLIAM JAY.

Witnesses:
M. PIEHN,
HAROLD KATZ.